United States Patent
Oehring et al.

(10) Patent No.: US 11,009,162 B1
(45) Date of Patent: May 18, 2021

(54) SYSTEM AND METHOD FOR INTEGRATED FLOW SUPPLY LINE

(71) Applicant: U.S. Well Services, LLC, Houston, TX (US)

(72) Inventors: Jared Oehring, Houston, TX (US); Brandon Hinderliter, Houston, TX (US); Lon Robinson, Houston, TX (US); Alexander James Christinzio, Houston, TX (US)

(73) Assignee: U.S. WELL SERVICES, LLC, Houston, TX (US)

( * ) Notice: Subject to any disclaimer, the term of this patent is extended or adjusted under 35 U.S.C. 154(b) by 0 days.

(21) Appl. No.: 16/728,359

(22) Filed: Dec. 27, 2019

(51) Int. Cl.
  *F16L 33/02* (2006.01)
  *E21B 43/26* (2006.01)
  *F04B 17/03* (2006.01)
  *F04B 15/02* (2006.01)
  *F04B 1/00* (2020.01)

(52) U.S. Cl.
  CPC .............. *F16L 33/02* (2013.01); *E21B 43/26* (2013.01); *F04B 1/00* (2013.01); *F04B 15/02* (2013.01); *F04B 17/03* (2013.01)

(58) Field of Classification Search
  CPC .. F16L 33/02; E21B 43/26; F04B 1/00; F04B 15/02; F04B 17/03
  See application file for complete search history.

(56) References Cited

U.S. PATENT DOCUMENTS

| | | | |
|---|---|---|---|
| 1,656,861 | A | 1/1928 | Leonard |
| 1,671,436 | A | 5/1928 | Melott |
| 2,004,077 | A | 6/1935 | McCartney |
| 2,183,364 | A | 12/1939 | Bailey |
| 2,220,622 | A | 11/1940 | Aitken |

(Continued)

FOREIGN PATENT DOCUMENTS

| | | |
|---|---|---|
| AU | 734988 | 9/1997 |
| CA | 2406801 | 11/2001 |

(Continued)

OTHER PUBLICATIONS

International Search Report and Written Opinion dated Jan. 2, 2020 in related PCT Application No. PCT/US19/55325.

(Continued)

*Primary Examiner* — Aaron L Lembo
(74) *Attorney, Agent, or Firm* — Hogan Lovells US LLP (57) ABSTRACT

A hydraulic fracturing system for fracturing a subterranean formation includes an electric powered pump having an inlet and an outlet, the outlet coupled to a well associated with the subterranean formation and powered by at least one electric motor. The system also includes a fluid source, coupled to the inlet of the electric powered pump, the fluid source providing a slurry for injection into the subterranean formation. The system further includes a hose extending between the fluid source and the electric powered pump, the hose being flexible and having a first diameter. The system includes a fitting between the hose and the electric powered pump, the fitting having a first end for receiving the hose at the first diameter and a second end for coupling to the electric powered pump at a second diameter, the second diameter being larger than the first diameter.

14 Claims, 3 Drawing Sheets

(56) References Cited

U.S. PATENT DOCUMENTS

| | | | |
|---|---|---|---|
| 2,248,051 A | 7/1941 | Armstrong | |
| 2,407,796 A | 9/1946 | Page | |
| 2,416,848 A | 3/1947 | Rothery | |
| 2,610,741 A * | 9/1952 | Schmid | B01D 35/02 |
| | | | 210/309 |
| 2,753,940 A | 7/1956 | Bonner | |
| 3,055,682 A * | 9/1962 | Bacher | F16L 33/18 |
| | | | 285/222.1 |
| 3,061,039 A | 10/1962 | Peters | |
| 3,066,503 A | 12/1962 | Fleming | |
| 3,302,069 A | 1/1967 | Webster | |
| 3,334,495 A | 8/1967 | Jensen | |
| 3,722,595 A | 3/1973 | Kiel | |
| 3,764,233 A | 10/1973 | Strickland | |
| 3,773,140 A | 11/1973 | Mahajan | |
| 3,837,179 A | 9/1974 | Barth | |
| 3,849,662 A | 11/1974 | Blaskowski | |
| 3,878,884 A | 4/1975 | Raleigh | |
| 3,881,551 A | 5/1975 | Terry | |
| 4,037,431 A | 7/1977 | Sugimoto | |
| 4,100,822 A | 7/1978 | Rosman | |
| 4,151,575 A | 4/1979 | Hogue | |
| 4,226,299 A | 10/1980 | Hansen | |
| 4,265,266 A | 5/1981 | Kierbow et al. | |
| 4,432,064 A | 2/1984 | Barker | |
| 4,442,665 A | 4/1984 | Fick et al. | |
| 4,456,092 A | 6/1984 | Kubozuka | |
| 4,506,982 A | 3/1985 | Smithers et al. | |
| 4,512,387 A | 4/1985 | Rodriguez | |
| 4,529,887 A | 7/1985 | Johnson | |
| 4,538,916 A | 9/1985 | Zimmerman | |
| 4,676,063 A | 6/1987 | Goebel et al. | |
| 4,759,674 A | 7/1988 | Schroder | |
| 4,793,386 A | 12/1988 | Sloan | |
| 4,845,981 A | 7/1989 | Pearson | |
| 4,922,463 A | 5/1990 | Del Zotto et al. | |
| 5,004,400 A | 4/1991 | Handke | |
| 5,006,044 A | 4/1991 | Walker, Sr. | |
| 5,025,861 A | 6/1991 | Huber | |
| 5,050,673 A | 9/1991 | Baldridge | |
| 5,130,628 A | 7/1992 | Owen | |
| 5,131,472 A | 7/1992 | Dees et al. | |
| 5,172,009 A | 12/1992 | Mohan | |
| 5,189,388 A | 2/1993 | Mosley | |
| 5,230,366 A * | 7/1993 | Marandi | G05D 7/01 |
| | | | 137/613 |
| 5,366,324 A | 11/1994 | Arlt | |
| 5,422,550 A | 6/1995 | McClanahan | |
| 5,433,243 A * | 7/1995 | Griswold | B01D 35/157 |
| | | | 137/498 |
| 5,439,066 A | 8/1995 | Gipson | |
| 5,517,822 A | 5/1996 | Haws et al. | |
| 5,548,093 A | 8/1996 | Sato | |
| 5,590,976 A | 1/1997 | Kilheffer et al. | |
| 5,655,361 A | 8/1997 | Kishi | |
| 5,736,838 A | 4/1998 | Dove et al. | |
| 5,755,096 A | 5/1998 | Holleyman | |
| 5,790,972 A | 8/1998 | Kohlenberger | |
| 5,865,247 A | 2/1999 | Paterson | |
| 5,879,137 A | 3/1999 | Yie | |
| 5,894,888 A | 4/1999 | Wiemers | |
| 5,907,970 A | 6/1999 | Havlovick et al. | |
| 5,985,750 A | 11/1999 | Oda | |
| 6,138,764 A | 10/2000 | Scarsdale et al. | |
| 6,142,878 A | 11/2000 | Barin | |
| 6,164,910 A | 12/2000 | Mayleben | |
| 6,202,702 B1 | 3/2001 | Ohira | |
| 6,208,098 B1 | 3/2001 | Kume | |
| 6,254,462 B1 | 7/2001 | Kelton | |
| 6,271,637 B1 | 8/2001 | Kushion | |
| 6,273,193 B1 | 8/2001 | Hermann | |
| 6,315,523 B1 | 11/2001 | Mills | |
| 6,477,852 B2 | 11/2002 | Dodo | |
| 6,484,490 B1 | 11/2002 | Olsen | |
| 6,491,098 B1 | 12/2002 | Dallas | |
| 6,529,135 B1 | 3/2003 | Bowers et al. | |
| 6,560,131 B1 | 5/2003 | VonBrethorst | |
| 6,626,646 B2 | 9/2003 | Rajewski | |
| 6,719,900 B2 * | 4/2004 | Hawkins | B01D 29/118 |
| | | | 210/248 |
| 6,765,304 B2 | 7/2004 | Baten et al. | |
| 6,776,227 B2 | 8/2004 | Beida | |
| 6,802,690 B2 | 10/2004 | Han | |
| 6,808,303 B2 | 10/2004 | Fisher | |
| 6,931,310 B2 | 8/2005 | Shimizu et al. | |
| 6,936,947 B1 | 8/2005 | Leijon | |
| 7,082,993 B2 | 8/2006 | Ayoub | |
| 7,104,233 B2 | 9/2006 | Ryczek et al. | |
| 7,170,262 B2 | 1/2007 | Pettigrew | |
| 7,173,399 B2 | 2/2007 | Sihler | |
| 7,308,933 B1 | 12/2007 | Mayfield | |
| 7,312,593 B1 | 12/2007 | Streicher et al. | |
| 7,336,514 B2 | 2/2008 | Amarillas | |
| 7,445,041 B2 | 11/2008 | O'Brien | |
| 7,494,263 B2 | 2/2009 | Dykstra et al. | |
| 7,500,642 B2 | 3/2009 | Cunningham | |
| 7,525,264 B2 | 4/2009 | Dodge | |
| 7,563,076 B2 | 7/2009 | Brunet | |
| 7,581,379 B2 | 9/2009 | Yoshida | |
| 7,675,189 B2 | 3/2010 | Grenier | |
| 7,683,499 B2 | 3/2010 | Saucier | |
| 7,717,193 B2 | 5/2010 | Egilsson et al. | |
| 7,755,310 B2 | 7/2010 | West et al. | |
| 7,807,048 B2 | 10/2010 | Collette | |
| 7,835,140 B2 | 11/2010 | Mori | |
| 7,845,413 B2 | 12/2010 | Shampine et al. | |
| 7,926,562 B2 | 4/2011 | Poitzsch | |
| 7,894,757 B2 | 7/2011 | Keast | |
| 7,977,824 B2 | 7/2011 | Halen et al. | |
| 7,984,757 B1 | 7/2011 | Keast | |
| 8,037,936 B2 | 10/2011 | Neuroth | |
| 8,054,084 B2 | 11/2011 | Schulz et al. | |
| 8,083,504 B2 | 12/2011 | Williams | |
| 8,091,928 B2 * | 1/2012 | Carrier | F16L 33/02 |
| | | | 285/242 |
| 8,096,354 B2 | 1/2012 | Poitzsch | |
| 8,096,891 B2 | 1/2012 | Lochtefeld | |
| 8,139,383 B2 | 3/2012 | Efraimsson | |
| 8,146,665 B2 | 4/2012 | Neal | |
| 8,154,419 B2 | 4/2012 | Daussin et al. | |
| 8,232,892 B2 | 7/2012 | Overholt et al. | |
| 8,261,528 B2 | 9/2012 | Chillar | |
| 8,272,439 B2 | 9/2012 | Strickland | |
| 8,310,272 B2 | 11/2012 | Quarto | |
| 8,354,817 B2 | 1/2013 | Yeh et al. | |
| 8,474,521 B2 | 7/2013 | Kajaria | |
| 8,506,267 B2 | 8/2013 | Gambier et al. | |
| 8,534,235 B2 | 9/2013 | Chandler | |
| 8,573,303 B2 | 11/2013 | Kerfoot | |
| 8,596,056 B2 | 12/2013 | Woodmansee | |
| 8,616,005 B1 | 12/2013 | Cousino | |
| 8,616,274 B2 | 12/2013 | Belcher et al. | |
| 8,646,521 B2 | 2/2014 | Bowen | |
| 8,692,408 B2 | 4/2014 | Zhang et al. | |
| 8,727,068 B2 | 5/2014 | Bruin | |
| 8,760,657 B2 | 6/2014 | Pope | |
| 8,763,387 B2 | 7/2014 | Schmidt | |
| 8,774,972 B2 | 7/2014 | Rusnak | |
| 8,789,601 B2 | 7/2014 | Broussard | |
| 8,795,525 B2 | 8/2014 | McGinnis et al. | |
| 8,800,652 B2 | 8/2014 | Bartko | |
| 8,807,960 B2 | 8/2014 | Stephenson | |
| 8,838,341 B2 | 9/2014 | Kumano | |
| 8,851,860 B1 | 10/2014 | Mail | |
| 8,857,506 B2 | 10/2014 | Stone, Jr. | |
| 8,899,940 B2 | 12/2014 | Laugemors | |
| 8,905,056 B2 | 12/2014 | Kendrick | |
| 8,905,138 B2 | 12/2014 | Lundstedt et al. | |
| 8,997,904 B2 | 4/2015 | Cryer | |
| 9,018,881 B2 | 4/2015 | Mao et al. | |
| 9,051,822 B2 | 6/2015 | Ayan | |
| 9,051,923 B2 | 6/2015 | Kuo | |
| 9,061,223 B2 * | 6/2015 | Winborn | B01D 35/02 |
| 9,062,545 B2 | 6/2015 | Roberts et al. | |

(56) References Cited

U.S. PATENT DOCUMENTS

| | | | |
|---|---|---|---|
| 9,067,182 B2 | 6/2015 | Nichols | |
| 9,103,193 B2 | 8/2015 | Coli | |
| 9,119,326 B2 | 8/2015 | McDonnell | |
| 9,121,257 B2 | 9/2015 | Coli et al. | |
| 9,140,110 B2 | 9/2015 | Coli et al. | |
| 9,160,168 B2 | 10/2015 | Chapel | |
| 9,260,253 B2 | 2/2016 | Naizer | |
| 9,322,239 B2 | 4/2016 | Angeles Boza et al. | |
| 9,324,049 B2 | 4/2016 | Thomeer | |
| 9,340,353 B2 | 5/2016 | Oren | |
| 9,366,114 B2 | 6/2016 | Coli et al. | |
| 9,410,410 B2 | 8/2016 | Broussard et al. | |
| 9,450,385 B2 | 9/2016 | Kristensen | |
| 9,475,020 B2 | 10/2016 | Coli et al. | |
| 9,475,021 B2 | 10/2016 | Coli et al. | |
| 9,482,086 B2 | 11/2016 | Richardson et al. | |
| 9,499,335 B2 | 11/2016 | McIver | |
| 9,506,333 B2 | 11/2016 | Castillo et al. | |
| 9,513,055 B1* | 12/2016 | Seal | F26B 19/00 |
| 9,534,473 B2 | 1/2017 | Morris et al. | |
| 9,562,420 B2 | 2/2017 | Morris et al. | |
| 9,587,649 B2 | 3/2017 | Oehring | |
| 9,611,728 B2 | 4/2017 | Oehring | |
| 9,650,871 B2 | 5/2017 | Oehring et al. | |
| 9,650,879 B2 | 5/2017 | Broussard et al. | |
| 9,706,185 B2 | 7/2017 | Ellis | |
| 9,728,354 B2 | 8/2017 | Skolozdra | |
| 9,738,461 B2 | 8/2017 | DeGaray | |
| 9,739,546 B2 | 8/2017 | Bertilsson et al. | |
| 9,745,840 B2 | 8/2017 | Oehring et al. | |
| 9,840,901 B2 | 12/2017 | Oehring et al. | |
| 9,863,228 B2 | 1/2018 | Shampine et al. | |
| 9,893,500 B2 | 2/2018 | Oehring | |
| 9,909,398 B2 | 3/2018 | Pham | |
| 9,915,128 B2 | 3/2018 | Hunter | |
| 9,932,799 B2 | 4/2018 | Symchuk | |
| 9,963,961 B2 | 5/2018 | Hardin | |
| 9,970,278 B2 | 5/2018 | Broussard | |
| 9,976,351 B2 | 5/2018 | Randall | |
| 9,995,218 B2 | 6/2018 | Oehring | |
| 10,008,880 B2 | 6/2018 | Vicknair | |
| 10,020,711 B2 | 7/2018 | Oehring | |
| 10,036,238 B2 | 7/2018 | Oehring | |
| 10,107,086 B2 | 10/2018 | Oehring | |
| 10,119,381 B2 | 11/2018 | Oehring | |
| 10,184,465 B2 | 1/2019 | Enis et al. | |
| 10,196,878 B2 | 2/2019 | Hunter | |
| 10,221,639 B2 | 3/2019 | Romer et al. | |
| 10,227,854 B2 | 3/2019 | Glass | |
| 10,232,332 B2 | 3/2019 | Oehring | |
| 10,246,984 B2 | 4/2019 | Payne | |
| 10,254,732 B2 | 4/2019 | Oehring | |
| 10,260,327 B2 | 4/2019 | Kajaria | |
| 10,280,724 B2 | 5/2019 | Hinderliter | |
| 10,287,873 B2 | 5/2019 | Filas | |
| 10,302,079 B2 | 5/2019 | Kendrick | |
| 10,309,205 B2 | 6/2019 | Randall | |
| 10,337,308 B2 | 7/2019 | Broussard | |
| 10,371,012 B2 | 8/2019 | Davis | |
| 10,378,326 B2 | 8/2019 | Morris | |
| 10,393,108 B2 | 8/2019 | Chong | |
| 10,407,990 B2 | 9/2019 | Oehring | |
| 10,408,030 B2 | 9/2019 | Dehring et al. | |
| 10,408,031 B2 | 9/2019 | Dehring et al. | |
| 10,415,332 B2 | 9/2019 | Morris | |
| 10,436,026 B2 | 10/2019 | Ounadjela | |
| 10,627,003 B2 | 4/2020 | Dale et al. | |
| 10,669,471 B2 | 6/2020 | Schmidt et al. | |
| 10,669,804 B2* | 6/2020 | Kotrla | E21B 33/06 |
| 10,695,950 B2 | 6/2020 | Igo et al. | |
| 10,711,576 B2 | 7/2020 | Bishop | |
| 10,740,730 B2 | 8/2020 | Altamirano et al. | |
| 2002/0169523 A1 | 11/2002 | Ross et al. | |
| 2003/0000759 A1 | 1/2003 | Schmitz | |
| 2003/0056514 A1 | 3/2003 | Lohn | |
| 2003/0079875 A1 | 5/2003 | Weng | |
| 2003/0138327 A1 | 7/2003 | Jones et al. | |
| 2004/0040746 A1 | 3/2004 | Niedermayr et al. | |
| 2004/0102109 A1 | 5/2004 | Crafty et al. | |
| 2004/0167738 A1 | 8/2004 | Miller | |
| 2005/0061548 A1 | 3/2005 | Hooper | |
| 2005/0116541 A1 | 6/2005 | Seiver | |
| 2005/0274508 A1 | 12/2005 | Folk | |
| 2006/0052903 A1 | 3/2006 | Bassett | |
| 2006/0065319 A1* | 3/2006 | Csitari | F01P 3/205 137/887 |
| 2007/0131410 A1 | 6/2007 | Hill | |
| 2007/0187163 A1 | 8/2007 | Cone | |
| 2007/0201305 A1 | 8/2007 | Heilman et al. | |
| 2007/0226089 A1 | 9/2007 | DeGaray et al. | |
| 2007/0277982 A1 | 12/2007 | Shampine | |
| 2007/0278140 A1 | 12/2007 | Mallet et al. | |
| 2008/0017369 A1 | 1/2008 | Sarada | |
| 2008/0041596 A1 | 2/2008 | Blount | |
| 2008/0095644 A1 | 4/2008 | Mantei et al. | |
| 2008/0112802 A1 | 5/2008 | Orlando | |
| 2008/0137266 A1 | 6/2008 | Jensen | |
| 2008/0208478 A1 | 8/2008 | Ella et al. | |
| 2008/0217024 A1 | 9/2008 | Moore | |
| 2008/0264625 A1 | 10/2008 | Ochoa | |
| 2008/0264649 A1 | 10/2008 | Crawford | |
| 2008/0277120 A1 | 11/2008 | Hickie | |
| 2009/0045782 A1 | 2/2009 | Datta | |
| 2009/0065299 A1 | 3/2009 | Vito | |
| 2009/0078410 A1 | 3/2009 | Krenek et al. | |
| 2009/0093317 A1 | 4/2009 | Kajiwara et al. | |
| 2009/0095482 A1 | 4/2009 | Surjaatmadja | |
| 2009/0145611 A1 | 6/2009 | Pallini, Jr. | |
| 2009/0153354 A1 | 6/2009 | Daussin et al. | |
| 2009/0188181 A1 | 7/2009 | Forbis | |
| 2009/0200035 A1 | 8/2009 | Bjerkreim et al. | |
| 2009/0260826 A1 | 10/2009 | Sherwood | |
| 2009/0308602 A1 | 12/2009 | Bruins et al. | |
| 2010/0000508 A1 | 1/2010 | Chandler | |
| 2010/0019574 A1 | 1/2010 | Baldassarre et al. | |
| 2010/0038907 A1 | 2/2010 | Hunt | |
| 2010/0045109 A1 | 2/2010 | Arnold | |
| 2010/0051272 A1 | 3/2010 | Loree et al. | |
| 2010/0132949 A1 | 6/2010 | DeFosse et al. | |
| 2010/0146981 A1 | 6/2010 | Motakef | |
| 2010/0172202 A1 | 7/2010 | Borgstadt | |
| 2010/0250139 A1 | 9/2010 | Hobbs et al. | |
| 2010/0293973 A1 | 11/2010 | Erickson | |
| 2010/0303655 A1 | 12/2010 | Scekic | |
| 2010/0322802 A1 | 12/2010 | Kugelev | |
| 2011/0005757 A1 | 1/2011 | Hebert | |
| 2011/0017468 A1 | 1/2011 | Birch et al. | |
| 2011/0052423 A1 | 3/2011 | Gambier et al. | |
| 2011/0061855 A1 | 3/2011 | Case et al. | |
| 2011/0085924 A1 | 4/2011 | Shampine | |
| 2011/0110793 A1 | 5/2011 | Leugemors et al. | |
| 2011/0166046 A1 | 7/2011 | Weaver | |
| 2011/0247878 A1 | 10/2011 | Rasheed | |
| 2011/0272158 A1 | 11/2011 | Neal | |
| 2012/0018016 A1 | 1/2012 | Gibson | |
| 2012/0049625 A1 | 3/2012 | Hopwood | |
| 2012/0085541 A1 | 4/2012 | Love et al. | |
| 2012/0127635 A1 | 5/2012 | Grindeland | |
| 2012/0152716 A1 | 6/2012 | Kikukawa et al. | |
| 2012/0205301 A1 | 8/2012 | McGuire et al. | |
| 2012/0205400 A1 | 8/2012 | DeGaray et al. | |
| 2012/0222865 A1 | 9/2012 | Larson | |
| 2012/0232728 A1 | 9/2012 | Karimi et al. | |
| 2012/0247783 A1 | 10/2012 | Berner, Jr. | |
| 2012/0255734 A1 | 10/2012 | Coli et al. | |
| 2013/0009469 A1 | 1/2013 | Gillett | |
| 2013/0025706 A1 | 1/2013 | DeGaray et al. | |
| 2013/0175038 A1 | 7/2013 | Conrad | |
| 2013/0175039 A1 | 7/2013 | Guidry | |
| 2013/0180722 A1 | 7/2013 | Olarte Caro et al. | |
| 2013/0189629 A1 | 7/2013 | Chandler | |
| 2013/0199617 A1 | 8/2013 | DeGaray et al. | |
| 2013/0233542 A1 | 9/2013 | Shampine | |
| 2013/0255271 A1 | 10/2013 | Yu et al. | |

(56) References Cited

U.S. PATENT DOCUMENTS

| | | | |
|---|---|---|---|
| 2013/0284278 A1* | 10/2013 | Winborn | F16L 15/00 137/15.01 |
| 2013/0284455 A1 | 10/2013 | Kajaria et al. | |
| 2013/0299167 A1 | 11/2013 | Fordyce et al. | |
| 2013/0306322 A1 | 11/2013 | Sanborn | |
| 2013/0317750 A1 | 11/2013 | Hunter | |
| 2013/0341029 A1 | 12/2013 | Roberts et al. | |
| 2013/0343858 A1 | 12/2013 | Flusche | |
| 2014/0000899 A1 | 1/2014 | Nevison | |
| 2014/0010671 A1 | 1/2014 | Cryer et al. | |
| 2014/0054965 A1 | 2/2014 | Jain | |
| 2014/0060658 A1 | 3/2014 | Hains | |
| 2014/0095114 A1 | 4/2014 | Thomeer | |
| 2014/0096974 A1 | 4/2014 | Coli | |
| 2014/0124162 A1 | 5/2014 | Leavitt | |
| 2014/0138079 A1 | 5/2014 | Broussard | |
| 2014/0174691 A1 | 6/2014 | Kamps | |
| 2014/0174717 A1 | 6/2014 | Broussard et al. | |
| 2014/0219824 A1 | 8/2014 | Burnette | |
| 2014/0238683 A1 | 8/2014 | Korach | |
| 2014/0246211 A1 | 9/2014 | Guidry et al. | |
| 2014/0251623 A1 | 9/2014 | Lestz et al. | |
| 2014/0255214 A1 | 9/2014 | Burnette | |
| 2014/0277772 A1 | 9/2014 | Lopez | |
| 2014/0290768 A1 | 10/2014 | Randle | |
| 2014/0379300 A1 | 12/2014 | Devine | |
| 2015/0027712 A1 | 1/2015 | Vicknair | |
| 2015/0053426 A1 | 2/2015 | Smith | |
| 2015/0068724 A1 | 3/2015 | Coli et al. | |
| 2015/0068754 A1 | 3/2015 | Coli et al. | |
| 2015/0075778 A1 | 3/2015 | Walters | |
| 2015/0083426 A1 | 3/2015 | Lesko | |
| 2015/0097504 A1 | 4/2015 | Lamascus | |
| 2015/0114652 A1 | 4/2015 | Lestz | |
| 2015/0136043 A1 | 5/2015 | Shaaban | |
| 2015/0144336 A1 | 5/2015 | Hardin et al. | |
| 2015/0159911 A1 | 6/2015 | Holt | |
| 2015/0175013 A1 | 6/2015 | Cryer et al. | |
| 2015/0176386 A1 | 6/2015 | Castillo et al. | |
| 2015/0211512 A1 | 7/2015 | Wiegman | |
| 2015/0211524 A1 | 7/2015 | Broussard | |
| 2015/0217672 A1 | 8/2015 | Shampine | |
| 2015/0225113 A1 | 8/2015 | Lungu | |
| 2015/0252661 A1 | 9/2015 | Glass | |
| 2015/0300145 A1 | 10/2015 | Coli et al. | |
| 2015/0300336 A1 | 10/2015 | Hernandez | |
| 2015/0314225 A1 | 11/2015 | Coli et al. | |
| 2015/0330172 A1 | 11/2015 | Allmaras | |
| 2015/0354322 A1 | 12/2015 | Vicknair | |
| 2016/0032703 A1 | 2/2016 | Broussard et al. | |
| 2016/0102537 A1 | 4/2016 | Lopez | |
| 2016/0105022 A1 | 4/2016 | Oehring | |
| 2016/0160889 A1 | 6/2016 | Hoffman et al. | |
| 2016/0177675 A1 | 6/2016 | Morris et al. | |
| 2016/0177678 A1 | 6/2016 | Morris | |
| 2016/0186531 A1 | 6/2016 | Harkless et al. | |
| 2016/0208592 A1 | 7/2016 | Oehring | |
| 2016/0208593 A1 | 7/2016 | Coli et al. | |
| 2016/0208594 A1 | 7/2016 | Coli et al. | |
| 2016/0208595 A1 | 7/2016 | Tang | |
| 2016/0221220 A1 | 8/2016 | Paige | |
| 2016/0230524 A1 | 8/2016 | Dumoit | |
| 2016/0230525 A1 | 8/2016 | Lestz et al. | |
| 2016/0258267 A1 | 9/2016 | Payne | |
| 2016/0265457 A1 | 9/2016 | Stephenson | |
| 2016/0273328 A1 | 9/2016 | Oehring | |
| 2016/0273456 A1 | 9/2016 | Zhang et al. | |
| 2016/0281484 A1 | 9/2016 | Lestz | |
| 2016/0290114 A1 | 10/2016 | Oehring | |
| 2016/0290563 A1 | 10/2016 | Diggins | |
| 2016/0312108 A1 | 10/2016 | Lestz et al. | |
| 2016/0319650 A1 | 11/2016 | Oehring | |
| 2016/0326853 A1 | 11/2016 | Fred et al. | |
| 2016/0326854 A1 | 11/2016 | Broussard | |
| 2016/0326855 A1 | 11/2016 | Coli et al. | |
| 2016/0341281 A1 | 11/2016 | Brunvold et al. | |
| 2016/0348479 A1 | 12/2016 | Oehring | |
| 2016/0349728 A1 | 12/2016 | Oehring | |
| 2016/0369609 A1 | 12/2016 | Morris et al. | |
| 2017/0016433 A1 | 1/2017 | Chong | |
| 2017/0021318 A1 | 1/2017 | McIver et al. | |
| 2017/0022788 A1 | 1/2017 | Oehring et al. | |
| 2017/0022807 A1 | 1/2017 | Dursun | |
| 2017/0028368 A1 | 2/2017 | Oehring et al. | |
| 2017/0030177 A1 | 2/2017 | Oehring | |
| 2017/0030178 A1 | 2/2017 | Oehring et al. | |
| 2017/0036178 A1 | 2/2017 | Coli et al. | |
| 2017/0036872 A1 | 2/2017 | Wallace | |
| 2017/0037717 A1 | 2/2017 | Oehring | |
| 2017/0037718 A1 | 2/2017 | Coli et al. | |
| 2017/0043280 A1 | 2/2017 | Vankouwenberg | |
| 2017/0051732 A1 | 2/2017 | Hemandez et al. | |
| 2017/0074076 A1 | 3/2017 | Joseph et al. | |
| 2017/0082033 A1 | 3/2017 | Wu et al. | |
| 2017/0096885 A1 | 4/2017 | Oehring | |
| 2017/0104389 A1 | 4/2017 | Morris et al. | |
| 2017/0114625 A1 | 4/2017 | Norris | |
| 2017/0130743 A1 | 5/2017 | Anderson | |
| 2017/0138171 A1 | 5/2017 | Richards et al. | |
| 2017/0145918 A1 | 5/2017 | Oehring | |
| 2017/0146189 A1 | 5/2017 | Herman | |
| 2017/0159570 A1 | 6/2017 | Bickert | |
| 2017/0159654 A1 | 6/2017 | Kendrick | |
| 2017/0175516 A1 | 6/2017 | Eslinger | |
| 2017/0212535 A1 | 7/2017 | Shelman et al. | |
| 2017/0218727 A1 | 8/2017 | Oehring | |
| 2017/0218843 A1 | 8/2017 | Oehring | |
| 2017/0222409 A1 | 8/2017 | Oehring | |
| 2017/0226838 A1 | 8/2017 | Ciezobka et al. | |
| 2017/0226839 A1 | 8/2017 | Broussard | |
| 2017/0226842 A1 | 8/2017 | Omont | |
| 2017/0234250 A1 | 8/2017 | Janik | |
| 2017/0241221 A1 | 8/2017 | Seshadri | |
| 2017/0259227 A1 | 9/2017 | Morris et al. | |
| 2017/0292513 A1 | 10/2017 | Haddad | |
| 2017/0302218 A1 | 10/2017 | Janik | |
| 2017/0313499 A1 | 11/2017 | Hughes et al. | |
| 2017/0314380 A1 | 11/2017 | Oehring | |
| 2017/0314979 A1 | 11/2017 | Ye | |
| 2017/0328179 A1 | 11/2017 | Dykstra | |
| 2017/0369258 A1 | 12/2017 | DeGaray | |
| 2017/0370639 A1 | 12/2017 | Barden et al. | |
| 2018/0028992 A1 | 2/2018 | Stegemoeller | |
| 2018/0038216 A1 | 2/2018 | Zhang | |
| 2018/0045331 A1 | 2/2018 | Lopez | |
| 2018/0090914 A1 | 3/2018 | Johnson et al. | |
| 2018/0156210 A1 | 6/2018 | Oehring | |
| 2018/0181830 A1 | 6/2018 | Laharuka et al. | |
| 2018/0183219 A1 | 6/2018 | Oehring | |
| 2018/0216455 A1 | 8/2018 | Andreychuk | |
| 2018/0238147 A1 | 8/2018 | Shahri | |
| 2018/0245428 A1 | 8/2018 | Richards | |
| 2018/0258746 A1 | 9/2018 | Broussard | |
| 2018/0259080 A1 | 9/2018 | Dale et al. | |
| 2018/0266217 A1 | 9/2018 | Funkhauser et al. | |
| 2018/0266412 A1 | 9/2018 | Stokkevag | |
| 2018/0274446 A1 | 9/2018 | Oehring | |
| 2018/0284817 A1 | 10/2018 | Cook et al. | |
| 2018/0291713 A1 | 10/2018 | Jeanson | |
| 2018/0298731 A1 | 10/2018 | Bishop | |
| 2018/0312738 A1 | 11/2018 | Rutsch et al. | |
| 2018/0320483 A1 | 11/2018 | Zhang | |
| 2018/0343125 A1 | 11/2018 | Clish | |
| 2018/0363437 A1 | 12/2018 | Coli | |
| 2019/0003329 A1 | 1/2019 | Morris | |
| 2019/0010793 A1 | 1/2019 | Hinderliter | |
| 2019/0063309 A1 | 2/2019 | Davis | |
| 2019/0100989 A1 | 4/2019 | Stewart | |
| 2019/0112910 A1 | 4/2019 | Oehring | |
| 2019/0119096 A1 | 4/2019 | Haile | |
| 2019/0120024 A1 | 4/2019 | Oehring | |
| 2019/0128080 A1 | 5/2019 | Ross | |
| 2019/0154020 A1 | 5/2019 | Glass | |
| 2019/0162061 A1 | 5/2019 | Stephenson | |

(56) References Cited

U.S. PATENT DOCUMENTS

| | | | |
|---|---|---|---|
| 2019/0169971 A1 | 6/2019 | Oehring | |
| 2019/0178057 A1 | 6/2019 | Hunter | |
| 2019/0178235 A1 | 6/2019 | Coskrey | |
| 2019/0203567 A1 | 7/2019 | Ross | |
| 2019/0203572 A1 | 7/2019 | Morris | |
| 2019/0211661 A1 | 7/2019 | Reckels | |
| 2019/0226317 A1 | 7/2019 | Payne | |
| 2019/0245348 A1 | 8/2019 | Hinderliter | |
| 2019/0249527 A1 | 8/2019 | Kraynek | |
| 2019/0292866 A1 | 9/2019 | Ross | |
| 2019/0292891 A1 | 9/2019 | Kajaria | |
| 2019/0316447 A1 | 10/2019 | Oehring | |
| 2020/0047141 A1 | 2/2020 | Oehring et al. | |
| 2020/0088152 A1 | 3/2020 | Allion et al. | |
| 2020/0232454 A1 | 7/2020 | Chretien | |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101977016 | 2/2011 |
| CN | 104196613 A | 12/2014 |
| CN | 205986303 U | 2/2017 |
| CN | 108049999 A | 5/2018 |
| JP | 2004264589 | 9/2004 |
| WO | 2016/144939 | 9/2016 |
| WO | 2016/160458 | 10/2016 |
| WO | 2018044307 A1 | 3/2018 |
| WO | 2018213925 A1 | 11/2018 |

OTHER PUBLICATIONS

Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Final Office Action dated Mar. 31, 2020 in related U.S. Appl. No. 15/356,436.
Non-Final Office Action dated Mar. 3, 2020 in related U.S. Appl. No. 16/152,695.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.

(56) References Cited

OTHER PUBLICATIONS

International Search Report and Written Opinion dated Feb. 15, 2019 in related PCT Patent Application No. PCT/US18/63977.
International Search Report and Written Opinion dated Mar. 5, 2019 in related PCT Patent Application No. PCT/US18/63970.
Non-Final Office Action dated Feb. 25, 2019 in related U.S. Appl. No. 16/210,749.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
International Search Report and Written Opinion dated Jul. 9, 2019 in corresponding PCT Application No. PCT/US2019/027584.
Non-Final Office Action issued in corresponding U.S. Appl. No. 16/170,695 dated Jun. 7, 2019.
Non-Final Office Action issued in corresponding Application No. 16/268,030 dated May 10, 2019.
Final Office Action issued in corresponding U.S. Appl. No. 16/210,749 dated Jun. 11, 2019.
Canadian Office Action dated May 30, 2019 in corresponding CA Application No. 2,833,711.
Canadian Office Action dated Jun. 20, 2019 in corresponding CA Application No. 2,964,597.
International Search Report and Written Opinion dated Jul. 9, 2019 in related PCT Application No. PCT/US2019/027584.
Office Action dated Jun. 7, 2019 in related U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
Office Action dated Dec. 6, 2019 in related U.S. Appl. No. 16/564,186.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-burner) 06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especlally WG Series Water Glycol Systems.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Canadian Office Action dated Aug. 17, 2020 in related CA Patent Application No. 2,944,968.
Office Action dated Jun. 22, 2020 in related U.S. Appl. No. 16/377,861.
Canadian Office Action dated Aug. 18, 2020 in related CA Patent Application No. 2,933,444.
International Search Report and Written Opinion dated Nov. 24, 2020 in corresponding PCT Application No. PCT/US20/44274.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.

* cited by examiner

SYSTEM AND METHOD FOR INTEGRATED FLOW SUPPLY LINE

BACKGROUND

1. Technical Field

This disclosure relates generally to hydraulic fracturing and more particularly to systems and methods for fluid supply lines utilized in hydraulic fracturing.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Hydraulic fracturing operations often try to increase flow rates through fracturing pumps in order to reduce operational times and save costs. However, typical fracturing systems have established component sizes and non-standard components are challenging to incorporate and may lead to errors, as operators may be unfamiliar with the new components. One such instance is in fluid flow lines (e.g., hoses) utilize to supply fracturing fluid to the pumps. Many flow lines utilized in the industry have a 4 inch diameter. However, this flow diameter limits fluid inlet into the pumps, which may be undesirable, because pumps operating at lower flow rates and/or pressures than desired may experience premature wear and failures. Moreover, merely increasing hose sizes is not practical because of component fittings on the pump and potential problems with flow rates, as flow rates that drop below a threshold may experience drop out of particulates, leading to blockages and other problems at the well site.

SUMMARY

Applicant recognized the problems noted above herein and conceived and developed embodiments of systems and methods, according to the present disclosure, for operating electric fracturing pumps.

In an embodiment, a hydraulic fracturing system for fracturing a subterranean formation includes an electric powered, multi-plunger pump having an inlet and an outlet, the outlet coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation. The system also includes a fluid source, coupled to the inlet of the electric powered pump, the fluid source providing a slurry for injection into the subterranean formation. The system further includes a hose extending between the fluid source and the electric powered pump, the hose being flexible and having a first diameter. The system includes a fitting between the hose and the electric powered pump, the fitting having a first end for receiving the hose at the first diameter and a second end for coupling to the electric powered pump at a second diameter, the second diameter being larger than the first diameter. The system also includes a distribution system, positioned between the wellbore and the electric powered pump, the distribution system collecting the slurry from electric powered pumps for injection into the subterranean formation.

In an embodiment, a hydraulic fracturing system for fracturing a subterranean formation includes an electric powered, multi-plunger pump having an inlet and an outlet, the outlet coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation. The system also includes a fluid source, coupled to the inlet of the electric powered pump, the fluid source providing a slurry for injection into the subterranean formation. The system includes a hose extending between the fluid source and the electric powered pump, the hose including a first end, for coupling to the fluid source, having a first diameter, a second end, for coupling to the inlet of the electric powered pump, having a second diameter, and a body between the first end and the second end having a third diameter, the third diameter being less than both the first diameter and the second diameter. The system further includes a pair of fittings, a first fitting forming the first end and a second fitting forming the second end, each fitting of the pair of fittings having a shank end for receiving at least a portion of the body and a union for engaging the respective fluid source and electric powered pump.

In an embodiment, a method for selecting a hose diameter for a flow line utilized in fracturing operations includes determining a first end connection size is a first diameter. The method also includes determining a second end connection size is a second diameter. The method further includes determining a first flow rate, associated with a first hose diameter, is below a threshold. The method includes determining a second flow rate, associated with a second hose diameter, exceeds the threshold. The method also includes forming the flow line using the second hose diameter.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise. Particular dimensions may be referred to herein along with their accompanying abbreviations, including but not limited to: inches (in, "), meters (m), centimeters (cm), pounds per square inch (PSI), pascals (Pa), feet per second (ft/s), barrels per minute (BPM), and the like.

Embodiments of the present disclosure include specialty-sized hoses developed in order to allow greater flow/supply to frac pumps (e.g., positive displacement, multi plunger pumps). This increased flow capability reduces cavitation events and prolongs equipment life. Specially selecting a 5" (0.127 m) diameter hose allows for fluid velocity to be maintained above a threshold at which sand particles would begin to fall out and eventually cause a blockage (sand off) the hose itself. In order to utilize this diameter/size hose in a large-scale function, a connection point was developed to enable use of standard 6" (0.1524 m) components, such as but not limited to hammer unions, butterfly valves, and other 6" steel pipe components. Embodiments include a hybrid of 5" hose and 6" end connectors. This then results in an improvement to existing methods of supplying fluid to a positive displacement pump.

Embodiments of the present disclosure present an improvement over existing systems by removing the standard 4" (0.1016 m) supply hoses while maintaining standard 6" connection types by utilizing a particularly designed ferrule. The standard 4" supply hose provides an insufficient volume of fracturing fluid to a pump utilizing in hydraulic fracturing operation. These problems may be compounded when 4" connections are also used. Using a 5" diameter hose supplies more volume, reduces pressure drop, and reduces cavitation and other poor conditions pumps can experience when not supplied adequately.

Figure 1:
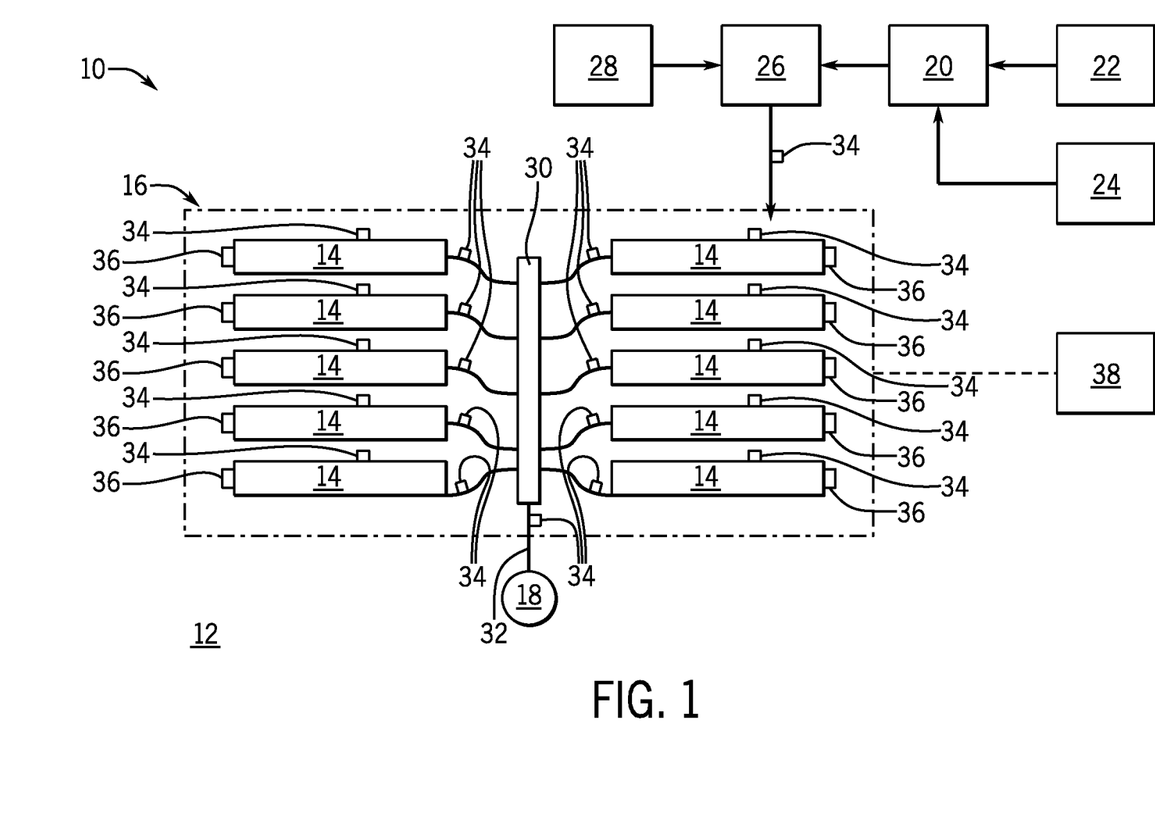
FIG. 1 is a schematic plan view of an embodiment of a fracturing operation, in accordance with embodiments of the present disclosure.

FIG. 1 is a plan schematic view of an embodiment of a hydraulic fracturing system 10 positioned at a well site 12. In the illustrated embodiment, pump units 14, which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump units 14 may receive the slurry solution at a first pressure (e.g., 80 psi to 160 psi) and boost the pressure to around 15,000 psi for injection into the wellhead 18. In certain embodiments, the pump units 14 are powered by electric motors.

After being discharged from the pump system 16, a distribution system 30, such as a missile, receives the slurry solution for injection into the wellhead 18. The distribution system 30 consolidates the slurry solution from each of the pump units 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like.

It should be appreciated that while various embodiments of the present disclosure may describe electric motors powering the pump units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3-phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Figure 2:
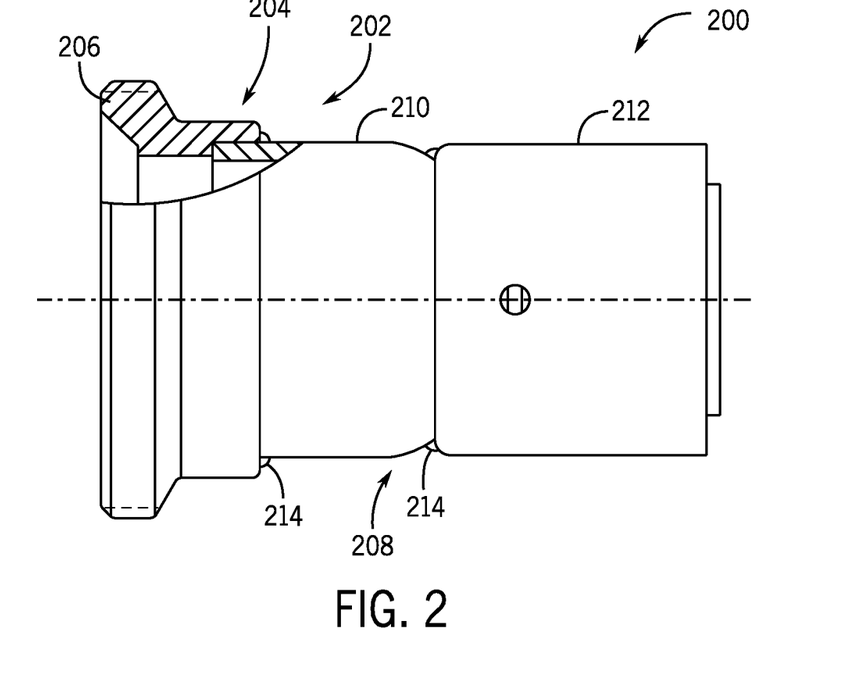
FIG. 2 is a side view of an embodiment of a fitting, in accordance with embodiments of the present disclosure.

FIG. 2 is a side view of an embodiment of a fitting 200 (e.g., ferrule) that may be utilized with embodiments of the present disclosure to incorporate 5" hoses into systems using 4" hoses and 6" fittings. In the illustrated embodiment, the fitting 200 includes a cutaway region 202 illustrating a coupling location 204 between a union 206 and a stem assembly 208. In the illustrated embodiment, the union 206 is configured to couple to a 6" coupling, for example on a pump. However, as illustrated, the stem assembly 208 includes a reducer 210 and a shank end 212 to receive a 5" hose (not pictured). For example, an end of the hose may be inserted into the shank end 212 and crimped, thereby joining the hose to the fitting 200. As a result, 5" hoses may be utilized in embodiments that include 6" fittings without significantly overhauling and/or modifying existing equipment. As discussed herein, 5" hoses provide numerous advantages including reduced pressure drop, greater capacity, and flow velocities greater than a threshold level corresponding to particulate drop out.

In the illustrated embodiment, various rigid couplings 214 are included along the fitting 200, for example, as welds utilizing to secure one or more components together. For example, there is a rigid coupling 214 between the union 206 and the reducer 210, as well as a rigid coupling 214 between the reducer 210 and the shank end 214. Accordingly, the components forming the fitting 200 may be particularly selected, based on one or more properties, for use with fracturing operations. For example, different fittings 200 may include different components. By way of example only, the union 206 may be replaced with a flanged end connection or the like.

Embodiments of the present disclosure that utilize the fitting 200 provide improved operations at a well site at least because greater volumes of fluid may be provided to fracturing pumps while maintaining flow rates above a threshold amount where particulates begin to drop out of the flow. For example, a 5" hose may meet rate demands while maintaining flow velocities at sufficient levels to reduce the likelihood of drop out. In contrast, a 4" hose may not meet rate demands and a 6" hose may not maintain flow velocities above the threshold for drop out. Moreover, the fitting 200 provides easy integration into existing systems without overhauling expensive equipment. For example, it may be costly to overhaul inlet piping on a fracturing pump, so much so, that it may be cost prohibitive to do so. Additionally, existing field equipment may be configured with certain specifications and include sunk costs, leading producers and operators to be reluctant to change. However, utilizing the fitting 200 enables existing equipment to remain in operation while providing improved operations.

Figure 3:
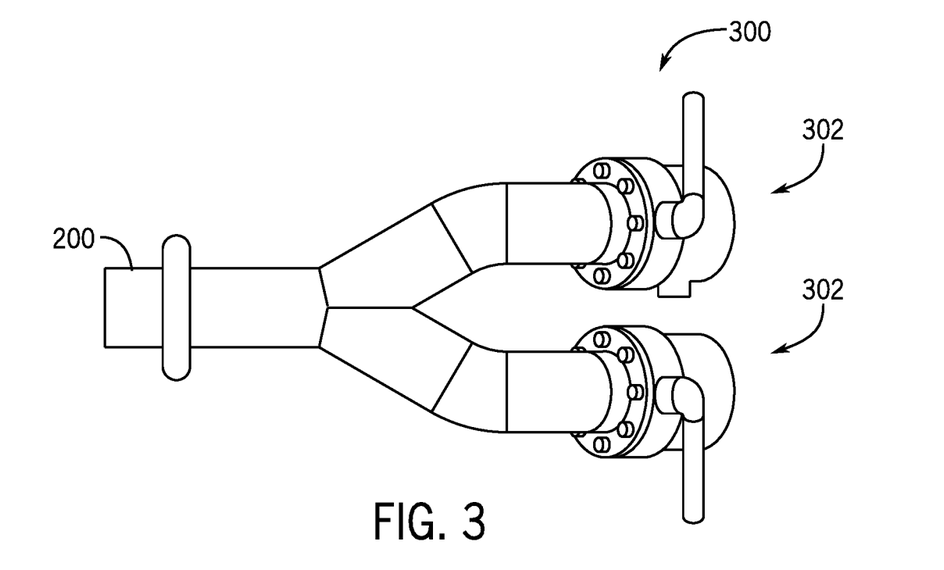
FIG. 3 is a schematic perspective view of an embodiment of a flow line, in accordance with embodiments of the present disclosure.

FIG. 3 is a schematic perspective view of an embodiment of a portion of a flow line 300 including the fitting 200. In the illustrated embodiment, the flow line 300 includes connections 302 for coupling to mating 6" connections. However, due to the inclusion of the fitting 200, a 5" flow line may be incorporated into the design. The fitting 200, as noted above includes a transition from the 5" line to a 6" connection, thereby enabling use with the illustrated flow line 300. Advantageously, the flow line 300 may continue to be used in wellbore operations without modifications, which may reduce costs to operators with respect to obtaining new equipment for jobs.

As noted above, embodiments of the present disclosure provide advantages over existing systems that either utilize flow lines having diameters that are too small to provide sufficient capacity or are too large to maintain fluid velocities above threshold levels. Embodiments of the present disclosure overcome these problems by providing more volume, reducing drop in pressure, and reducing a likelihood of cavitation and other unhealthy pump conditions, such as starving. By way of example, frac slurry often consists of sand media also known as proppant, at low fluid velocities this proppant can begin to fall out of suspension. Some industry data notes that sand fall out begins at 2.21 ft/sec, which equates to 3.2 BPM in a 5" hose. Sand fall out is substantial at 1.72 ft/sec, which equates to 2.2 BPM in a 5" hoses. As a result, systems may be deployed to ensure that flow rates are maintained above these levels (which may be set as the thresholds) during operation.

Furthermore, embodiments of the present disclosure improve existing systems by reducing damage accumulation rates due to the improved flow characteristics associated with the 5" hose when compared to the 4" hose of existing systems. For example, a damage accumulate rate associated with the 5" hose may be less than the 4" hose and may increase at a lower rate as flow rate increases. Damage accumulation may be a factor, at least in part, on flow velocities, where a small diameter pipe will have greater velocities than a larger diameter pipe.

Figure 4:
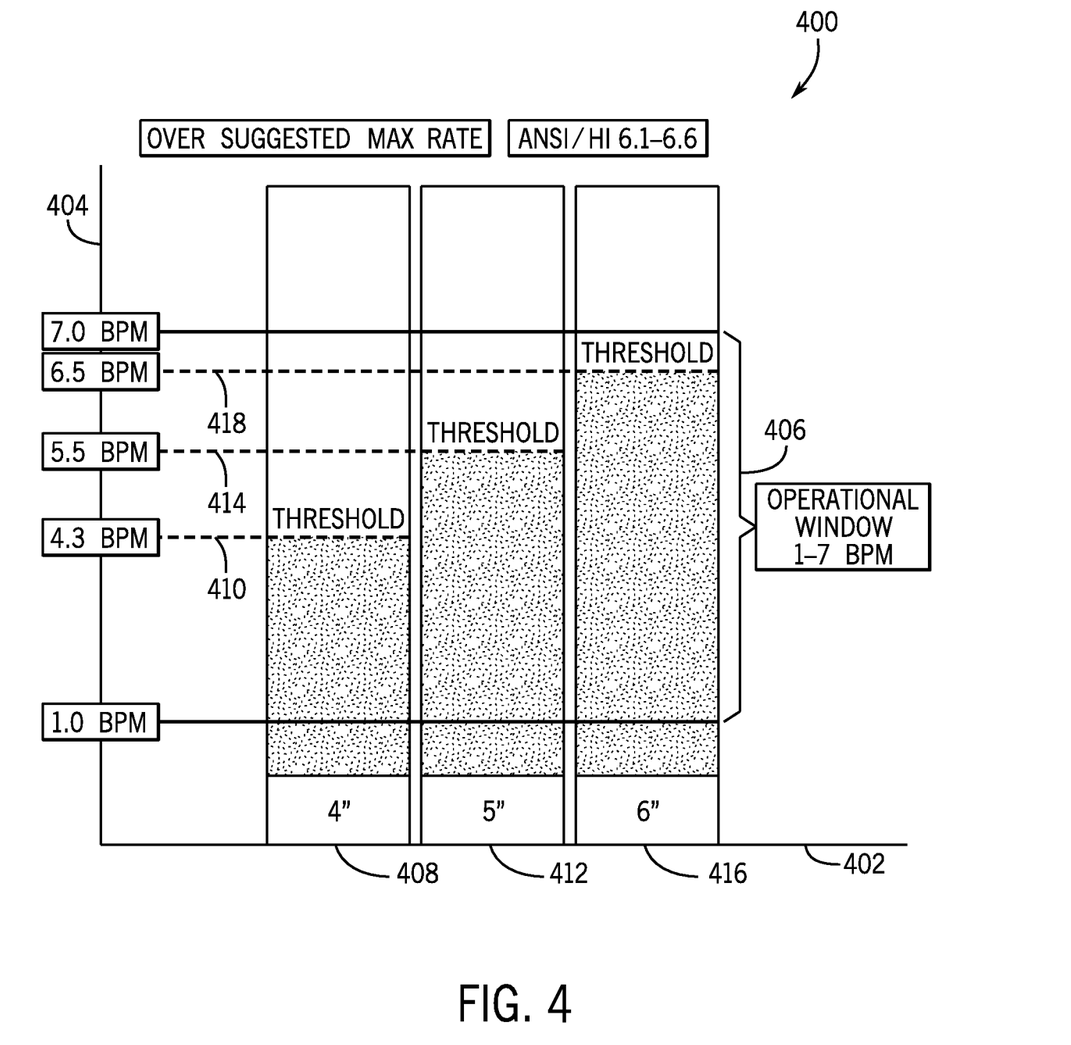
FIG. 4 is a graphical representation of suction pipe flow rates, in accordance with embodiments of the present disclosure.

FIG. 4 is a graphical representation 400 illustrating pump flow rates and respective suction piping sizes. The x-axis 402 corresponds to suction pipe diameter (in inches) and the y-axis 404 corresponds to flow rate (in BPM). An operational window 406 is provided indicative of typical ranges where fracturing operations may occur. In this embodiment, the operational widow 406 extends from approximately 1 BPM to approximately 7 BPM.

Each respective suction pipe diameter includes a threshold flow rate, which may be obtained through experimental procedures and/or reference materials. For example, a 4" suction pipe illustrated at 408 has a threshold 410 of approximately 4.3 BPM, a 5" suction pipe illustrated at 412 has a threshold 414 of approximately 5.5 BPM, and a 6" suction pipe illustrated at 416 has a threshold 418 of approximately 6.5 BPM. The operational window 406 includes a portion that exceeds each of the illustrated thresholds 410, 414, 418.

Operations using the 4" suction pipe 408 include an operating range that is approximately 40% larger than the threshold 410. As a result, there is a high likelihood that operations will exceed the threshold due to demands to supply additional fluid for fracturing operations. Similarly, operations using the 5" suction pipe 412 and the 6" suction pipe 416 also exceed threshold 414, 418 by approximately 22% and 7%, respectively. The instant application has identified that while the 6" suction pipe 416 enables the largest flow rate, that problems associated with fluid velocities and drop out make the 6" suction pipe 416 undesirable. Accordingly, embodiments may incorporate the 5" suction pipe 412, which provides significant improvements over the 4" suction pipe 408 while also reducing the likelihood of drop out. The 5" suction pipe 412 also has less pressure drop, when compared to the 4" suction pipe 408, providing an additional improvement over existing configurations.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A hydraulic fracturing system for fracturing a subterranean formation, comprising:
   an electric powered, multi-plunger hydraulic fracturing pump having an inlet and an outlet, the outlet coupled to a well associated with the subterranean formation and powered by at least one electric motor;
   a fluid source, coupled to the inlet of the electric powered pump, the fluid source providing a slurry for injection into the subterranean formation;
   a hose extending between the fluid source and the electric powered pump, the hose being flexible and having a first diameter;
   a fitting between the hose and the electric powered pump, the fitting having a first end for receiving the hose at the first diameter and a second end for coupling to the electric powered pump at a second diameter, the second diameter being larger than the first diameter; and
   a distribution system, positioned between the wellbore and the electric powered pump, the distribution system collecting the slurry from electric powered pumps for injection into the subterranean formation.

2. The system of claim 1, wherein the first diameter is approximately 5 inches and the second diameter is approximately 6 inches.

3. The system of claim 1, wherein the fitting further comprises:
   a union at the second end, the union configured to couple to a mating fitting;
   a shank end at the first end, the shank end receiving at least a portion of the hose, the shank end being crimped over at least the portion of the hose; and
   a reducer between the union and the shank end, at least a portion of the reducer extending into a groove formed in the union, the union extending farther laterally than the reducer.

4. The system of claim 3, wherein the fitting is formed as an integral piece with at least one rigid coupling between at least one of the union, the shank end, and the reducer.

5. The system of claim 1, wherein the first diameter is particularly selected based at least in part on a threshold, the threshold corresponding to a drop out rate for the slurry.

6. The system of claim 1, wherein the first diameter is particularly selected based at least in part on a pressure drop rate, a damage accumulation rate, or a suggested flow rate.

7. The system of claim 1, wherein the first diameter is associated with a second threshold, corresponding to a maximum suggested flow rate, an operating window for the electric powered pump exceeding the maximum suggested flow rate.

8. The system of claim 1, further comprising:
   a plurality of electric powered, multi-plunger pumps, each pump receiving fluid from the fluid source;
   a plurality of hoses having the first diameter; and
   a plurality of fittings between respective hoses of the plurality of the hoses and respective pumps of the plurality of pumps, each of the pumps having a connection having the second diameter.

9. A hydraulic fracturing system for fracturing a subterranean formation, comprising:
   an electric powered, multi-plunger hydraulic fracturing pump having an inlet and an outlet, the outlet coupled to a well associated with the subterranean formation and powered by at least one electric motor;
   a fluid source, coupled to the inlet of the electric powered pump, the fluid source providing a slurry for injection into the subterranean formation;
   a hose extending between the fluid source and the electric powered pump, the hose being flexible and having a first diameter;
   a fitting between the hose and the electric powered pump, the fitting comprising:
      a union arranged at a first end, the union having a second diameter, larger than the first diameter, and being configured to couple to the pump;
      a shank end configured to receive at least a portion of the hose, the shank end being securable to at least the portion of the hose, the shank end including an opening to receive the shank end; and
      a reducer positioned between the union and the shank end, the reducer being welded to the respective union and shank end at each end, the reduce having an increasing diameter along its axial length, the reducer extending at least partially into the union; and
   a distribution system, positioned between the wellbore and the electric powered pump, the distribution system collecting the slurry from electric powered pumps for injection into the subterranean formation.

10. The system of claim 9, wherein the first diameter is approximately 5 inches and the second diameter is approximately 6 inches.

11. The system of claim 9, wherein the first diameter is particularly selected based at least in part on a threshold, the threshold corresponding to a drop out rate for the slurry.

12. The system of claim 9, wherein the first diameter is particularly selected based at least in part on a pressure drop rate, a damage accumulation rate, or a suggested flow rate.

13. The system of claim 9, wherein the first diameter is associated with a second threshold, corresponding to a maximum suggested flow rate, an operating window for the electric powered pump exceeding the maximum suggested flow rate.

14. The system of claim 9, further comprising:
   a plurality of electric powered, multi-plunger pumps, each pump receiving fluid from the fluid source;
   a plurality of hoses having the first diameter; and
   a plurality of fittings between respective hoses of the plurality of the hoses and respective pumps of the plurality of pumps, each of the pumps having a connection having the second diameter.

* * * * *